(12) United States Patent
Deligne et al.

(10) Patent No.: US 7,574,358 B2
(45) Date of Patent: Aug. 11, 2009

(54) NATURAL LANGUAGE SYSTEM AND METHOD BASED ON UNISOLATED PERFORMANCE METRIC

(75) Inventors: Sabine Deligne, New York, NY (US); Yuqing Gao, Mount Kisco, NY (US); Vaibhava Goel, Elmsford, NY (US); Hong-Kwang Kuo, Pleasantville, NY (US); Cheng Wu, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 11/067,819

(22) Filed: Feb. 28, 2005

(65) Prior Publication Data

US 2006/0195321 A1   Aug. 31, 2006

(51) Int. Cl.
G10L 15/00    (2006.01)
(52) U.S. Cl. ............... 704/243; 704/246; 704/251; 704/255; 704/256.5; 704/257
(58) Field of Classification Search ............ None
See application file for complete search history.

(56) References Cited

U.S. PATENT DOCUMENTS

| | | | |
|---|---|---|---|
| 6,269,153 B1 | 7/2001 | Carpenter et al. | |
| 7,016,849 B2 * | 3/2006 | Arnold et al. | 704/275 |
| 7,092,888 B1 * | 8/2006 | McCarthy et al. | 704/277 |
| 7,231,019 B2 * | 6/2007 | Pascovici | 379/88.02 |
| 2003/0036903 A1 * | 2/2003 | Konopka et al. | 704/249 |
| 2004/0230420 A1 * | 11/2004 | Kadambe et al. | 704/205 |
| 2008/0147404 A1 * | 6/2008 | Liu et al. | 704/256.2 |

OTHER PUBLICATIONS

P. Woodland et al, "Large scale discriminative training for speech recognition," Computer Speech and Language, vol. 16, pp. 25-47, 2002.
B.-H. Juang et al, "Minimum classification error rate methods for speech recognition," IEEE Transactions on Speech and Audio Processing, vol. 5, No. 3, pp. 257-265, May 1997.
H.-K. Kuo et al, "Discriminative training of language models for speech recognition," in Proc. ICASSP 2002, Orlando, Florida, pp. I-325-I-328, May 2002.
P.S. Gopalakrishnan et al, "An inequality for rational functions with applications to some statistical estimation problems," IEEE Transactions on Information Theory, vol. 37, No. 1, Jan. 1991, pp. 107-113.

(Continued)

*Primary Examiner*—Richemond Dorvil
*Assistant Examiner*—Leonard Saint Cyr
(74) *Attorney, Agent, or Firm*—Ryan, Mason & Lewis, LLP

(57) ABSTRACT

A natural language business system and method is developed to understand the underlying meaning of a person's speech, such as during a transaction with the business system. The system includes a speech recognition engine, and action classification engine, and a control module. The control module causes the system to execute an inventive method wherein the speech recognition and action classification models may be recursively optimized on an unisolated performance metric that is pertinent to the overall performance of the natural language business system, as opposed to the isolated model-specific criteria previously employed.

1 Claim, 6 Drawing Sheets

OTHER PUBLICATIONS

S. Katagiri et al, "Pattern recognition using a family of design algorithms based upon the generalized probabilistic descent method," Proceedings of the IEEE, vol. 86, No. 11, Nov. 1998, pp. 2345-2373.

G. Ricccardi, "Language model adaptation for spoken language systems," in Proc. ICSLP 1998, Sydney, Australia, Dec. 1998.

B. Souvignier et al, "Online adaptation for language models in spoken dialogue systems," in Proc. ICSLP 1998, Sydney, Australia, Dec. 1998.

H.-K. Kuo et al, "Discriminative training of natural language call routers," IEEE Transactions on Speech and Audio Processing, vol. 11, No. 1, pp. 100-109, Jan. 2003.

G. Tur et al, "Extending boosting for call classification using word confusion networks," IEEE, ICASSP 2004, Montreal, Canada, May 2004, pp. I-437-I-440.

G. Tur et al, "Improving spoken language understanding using word confusion networks," AT&T Labs-Research, Florham Park, New Jersey, in Proceedings ICSLP 2002, pp. 1137-1140.

S. Chen et al, "An empirical study of smoothing techniques for language modeling," in Tech. Rep. TR-10-98, Center for Research in Computing Technology, Harvard University, MA 1998, pp. 310-318.

V. Goel, "Conditional maximum likelihood estimation for improving annotation performance of N-gram models incorporating stochastic finite state grammars," in Proc. ICSLP 2004, Jeju Island, Korea, Oct. 2004.

A. Berger et al, "A maximum entropy approach to natural language processing," Association for computational Linguistics, vol. 22, No. 1, pp. 39-71, 1996.

J.-L. Gauvain et al, "Maximum a posteriori estimation for multivariate Gaussian mixture observations of Markov chains," IEEE Transactions on Speech and Audio Processing, vol. 2, No. 2, Apr. 1994, pp. 291-298.

L. Mangu et al, "Finding consensus in speech recognition: word error minimization and other applications of confusion networks," pp. 1-35 of preprint of article appearing in Computer Speech and Language vol. 14, No. 4, pp. 373-400 (Oct. 2000).

J.-L. Gauvain et al, "MAP estimation of continuous density HMM: theory and applications," Proc. DARPA Speech and Natural Language, Morgan Kaufmann, pp. 1-6, Feb. 1992.

B. Roark et al, "Corrective language modeling for large vocabulary ASR with the perceptron algorithm," IEEE ICASSP, pp. I-749-I-752, 2004.

C. Chelba et al, "Discriminative training of N-gram classifiers for speech and text routing," Eurospeech 2003, Geneva, Switzerland, Sep. 2003, pp. 2777-2780.

Y.-Y. Wang et al, "Is word error rate a good indicator for spoken language understanding accuracy," IEEE ASRU, pp. 577-582, 2003.

* cited by examiner

NATURAL LANGUAGE SYSTEM AND METHOD BASED ON UNISOLATED PERFORMANCE METRIC

FIELD OF THE INVENTION

The present invention relates to natural language business systems and methods, and, more particularly, relates to a natural language business system and method where performance is measured, and can be optimized, based on an unisolated performance metric.

BACKGROUND OF THE INVENTION

Natural language business systems typically require transcription of speech and labels of correct concepts or classes. Further, large amounts of transcribed and/or labeled data are typically required to train statistical models such as understanding models or speech recognition models, including acoustic and language models. Human transcription of speech data tends to be costly, slow and unreliable. Further, correct classification is also challenging. For example, in the case of a natural language call routing system, knowledge of domain and business logic may be spread across many different departments and representatives, each of whom may only have knowledge of a limited area. Accordingly, to cover an entire enterprise, data labeling and checking may need to be done by several different experts in order to ensure high accuracy, which tends to be a very costly procedure. Furthermore, statistical models have typically been trained in isolation to optimize a parameter associated only with the particular statistical model. However, such criteria may not be appropriate for the best overall performance of a natural language business system.

In view of the foregoing, there is a need in the prior art for training statistical models in a manner that produces desirable results for the overall natural language business system, and there is also a need for automated transcription and labeling of appropriate operational data.

SUMMARY OF THE INVENTION

The present invention, which addresses the needs identified in the prior art, provides a method of developing a natural language business system based on an initial speech recognition model and an initial action classification model. Such a system, during operation, typically engages in a number of transactions. The method includes the steps of obtaining audio data and associated transaction classification data during operation of the system based on the initial speech recognition and action classification models. Such data is obtained for at least pertinent transactions. The method also includes the step of modifying one or more of the initial speech recognition model and the initial action classification model to obtain an iterated speech recognition model and an iterated action classification model. The modifying is based at least in part on the audio data and associated transaction classification data that is obtained during operation. The modifying is carried out to effect a desired change in an unisolated performance metric that is pertinent to the performance of the natural language business system.

The speech recognition and action classification models can optionally be jointly modified. Furthermore, the modifying step can be repeated until a desired convergence criterion is achieved. Updated models resulting from the modification can be compared to base-line models, and if desired, additional data can be gathered and another cycle of modification of the models can be commenced.

Further, the present invention includes a natural language business system which can interface with a speech recognition module, an action classification module, and a processing center that conducts a plurality of verbal transactions. The system can include a speech recognition interface, an action classification interface, and a control module. The control module can be coupled, through the respective interfaces, to the speech recognition module and the action classification module. The control module can modify an initial speech recognition model and/or an initial action classification model to obtain iterated models. The modification can be based at least in part on transcribed speech data and transaction classification data, and can be conducted so as to effect a desired change in an unisolated performance metric that is pertinent to performance of the natural language business system. The control module can be configured to cause the system to execute additional method steps as set forth above.

A more complete understanding of the present invention, as well as further features and advantages of the present invention, will be obtained by reference to the following detailed description and drawings.

DETAILED DESCRIPTION OF PREFERRED EMBODIMENTS

Figure 5:
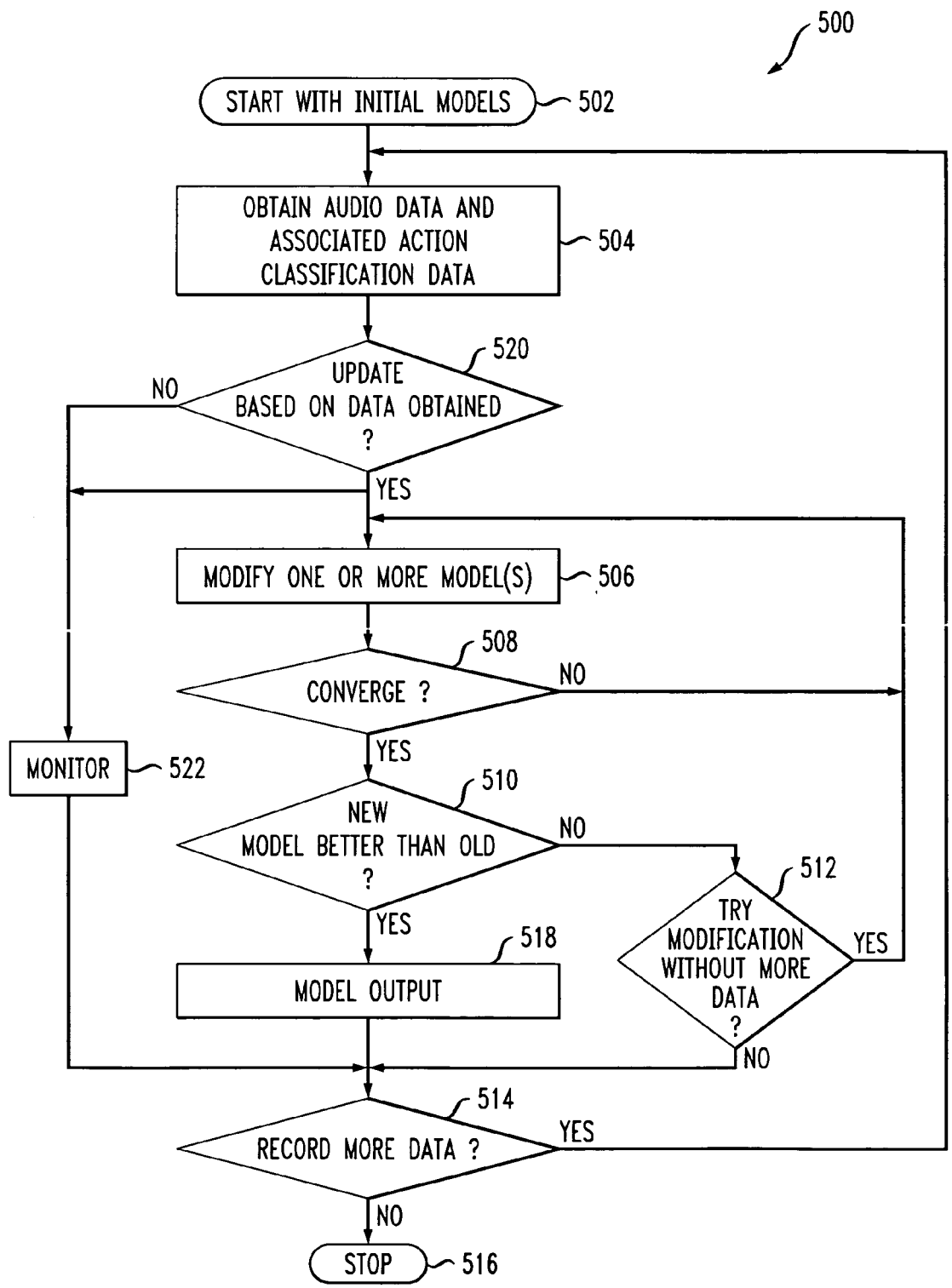
FIG. 5 is a flow chart of a method of developing a natural language business system in accordance with the present invention.

Reference should now be had to FIG. 5 which depicts a flow chart 500 of a method of developing a natural language business system in accordance with the present invention. The system is based on initial models, such as an initial speech recognition model and an initial action classification model, as indicated at block 502. During operation, the system engages in a plurality of transactions. Note that the transactions can include both initial interactions with the system, and, for example, in the case of a call center, subsequent transfer of wrongly directed calls. Calls can also be handled initially with human operator assistance. Regardless of whether the automated system or human operators are handling the calls, data collection of the recorded speech and transfer patterns as described below can be done automatically.

The method can include the step of obtaining, during operation of the system based on the initial speech recognition model and the initial action classification model, audio data and associated transaction classification data, as indicated at block 504. Such data can be collected for pertinent transactions. Furthermore, the method can include the step of modifying either the initial speech recognition model, or the initial action classification model, or both, to obtain an iterated speech recognition model and an iterated action classification model. Such modification is indicated at block 506. It should be noted that the iterated models may not both be different from the initial models; where desired, only one may be modified. However, as many can be modified as are advantageous, as discussed below. The modification of the models is based at least in part on the audio data and associated transaction classification data obtained at block 504, and is carried out so as to effect a desired change in an unisolated performance metric that is pertinent to performance of the natural language business system.

As used herein, the term "unisolated performance metric" shall mean any performance metric that is pertinent to overall or "end-to-end" system performance, as opposed to isolated performance metrics that focus on performance of a single system component. By way of example, "unisolated performance metric" is intended to encompass raw routing accuracy/concept accuracy (in call centers, e.g.), classification accuracy (in other natural language business systems), automation rate (i.e., portion of calls or other transactions to be handled without human intervention), and the like, including any of the foregoing weighted by cost or performance functions. "Unisolated performance metric" is to be distinguished from prior-art isolated performance metrics, e.g., word error rate for a speech recognizer, that focus on performance of the individual component rather than the overall system. As will be discussed in greater detail below, such an unisolated performance metric is distinguished from prior art systems where optimization is typically based on optimizing a metric related to a single model, as opposed to the overall performance of the system.

By way of further explanation, routing accuracy on a spoken utterance is appropriately quantified by a metric to measure accuracy of intent classification or natural language call routing. Concept or semantic accuracy on a spoken utterance is appropriately quantified by a metric to measure accuracy of the main concepts that are being conveyed by the caller. For example: "I um would like a reservation next Tuesday to fly uh to fly from Boston to Atlanta at yeah around 9 am" is parsed by a semantic parser into a semantic representation such as "(GOAL: MAKE_RESERVATION) (DATE: TUESDAY) (TIME: 9 am) (DEPART_CITY: BOSTON) (ARRIVE_CITY: ATLANTA)" So the metric will count only the semantically important words and ignore other semantically un-important words like "uh" "um" and repetitions, etc. This is quite different from the isolated performance metric of word error rate, which counts every single word in the sentence. The aforementioned unisolated performance metrics of the present invention are inherently unisolated because the raw data is a spoken utterance, not a transcription thereof. Weighting by cost or performance functions can include consideration of total operator costs: for example, some operators may be much more expensive or have higher call loads than others; it is also possible to weigh customer satisfaction by customer value: high revenues customers may be given greater importance and errors or time delays as to such customers may be very costly.

As noted, the modifying step can involve modifying one or more of the initial models, and can include jointly modifying both the initial speech recognition model and the initial action classification model in order to effect the desired change in the unisolated performance metric. Still referring to FIG. 5, an additional method step can include repeating the modifying step with the iterated speech recognition model and the iterated action classification model substituted for the initial speech recognition and action classification models, until a desired value of the unisolated performance metric is achieved. This is indicated by decision block 508 in FIG. 5. Typically, such a desired value could correspond to convergence of the modification process. Accordingly, the loop indicated by blocks 506, 508 may be understood as a recursive optimization of the unisolated performance metric. While such optimization can be a result of the recursive process, nevertheless, resulting models may be further enhanced as desired. Further, it should be noted that the desired value of the unisolated performance metric need not necessarily be a specific numerical value, but can be, for example, a maxima or a minima.

It should also be noted that the transaction classification data may be implicit or explicit. For example, an explicit classification might be encountered in a case when a user stated "I want the auto loan department" or "I want the travel agent who handles Caribbean vacations." Conversely, implicit transaction classification can be encountered when a user says an utterance such as "My car broke down last week," or "I'd really like a break on a warm, sunny beach."

Referring now to block 510 in FIG. 5, after the modification has converged, the iterated models generated can be evaluated against a suitable baseline. If the iterated models compare favorably to the baseline, the iterated models can be formatted for subsequent use in operation of the natural language business system. Conversely, if the iterated models do not compare favorably with the baseline, the steps of obtaining additional data and then modifying the models can be repeated. This is indicated at the "NO" outlet of decision block 510, where an additional decision 512 is made as to whether it is desired to attempt further modification without additional data, as indicated at the "YES" output of block 512, or in the alternative, to decide whether or not more data should be recorded, as at block 514, and if such is the case, looping back to obtain additional data at block 504. Block 512 is optional, as in the typical case, without more data, the performance may not improve after convergence. However, block 512 can be used, for example, when alternative algorithms are to be employed without gathering additional data. If it is not desired to record more data, the process can be stopped, as indicated at block 516. Monitoring per block 522 can be carried out, where desired, even when the process is nominally stopped per block 516. Note that the aforementioned formatting of the iterated models for subsequent use in operation of the system is indicated at block 518.

Referring to block 520, note that, before going through the modification process once new data has been obtained, a decision can be made as to whether it is desired to update the models based on the new data obtained, or to simply monitor performance of the system, as indicated at block 522.

As noted, one application of the present invention is in the case where the natural language business system is a call routing system. In such a case, in the modifying step, the unisolated performance metric can be a classification error rate that is indicative of the end-to-end routing accuracy of the call routing system.

In the general case, in the modifying step, the unisolated performance metric can be given by the equation:

$$M = f(ZPC), \qquad (1)$$

where:

Z includes a parameter related to at least one of raw accuracy, automation rate, and concept accuracy;

P is a performance weight parameter;

C is a cost weighting parameter; and f is a function of Z, P and C selected based on business needs; it can be a simple product or a more complex function determined empirically or analytically.

It will appreciated that where there is no desire to weight the parameter Z by performance and/or cost, dependency on either or both of the P, C can be eliminated. Accuracy measures such as the raw accuracy and concept accuracy relate to the overall performance of the system and the models that constitute the system, as opposed to the isolated optimization of individual models that has been employed in prior art systems. The automation rate is also a parameter indicative of overall system performance, and can be used to measure the number of transactions that can be appropriately handled by the system without human intervention.

It will be appreciated that a speech recognition model can typically include both an acoustic model and a language model; accordingly, the initial speech recognition model can include an initial acoustic model and an initial language model, and the iterated speech recognition model can include an iterated acoustic model and an iterated language model. Typically, either or both of the language and acoustic models can be changed in the modification process. However, the terminology "iterated" means that the models have gone through the iterative step but not necessarily that both of them must have changed. Accordingly, as noted, the step of modifying the initial speech recognition model can include modifying the initial language model or the initial acoustic model or both.

One preferred method of expressing the unisolated performance metric is as the parameter R in equation 8 below. In the case where R is used to represent the unisolated performance metric, its desired value is typically a maximum.

Figure 6:
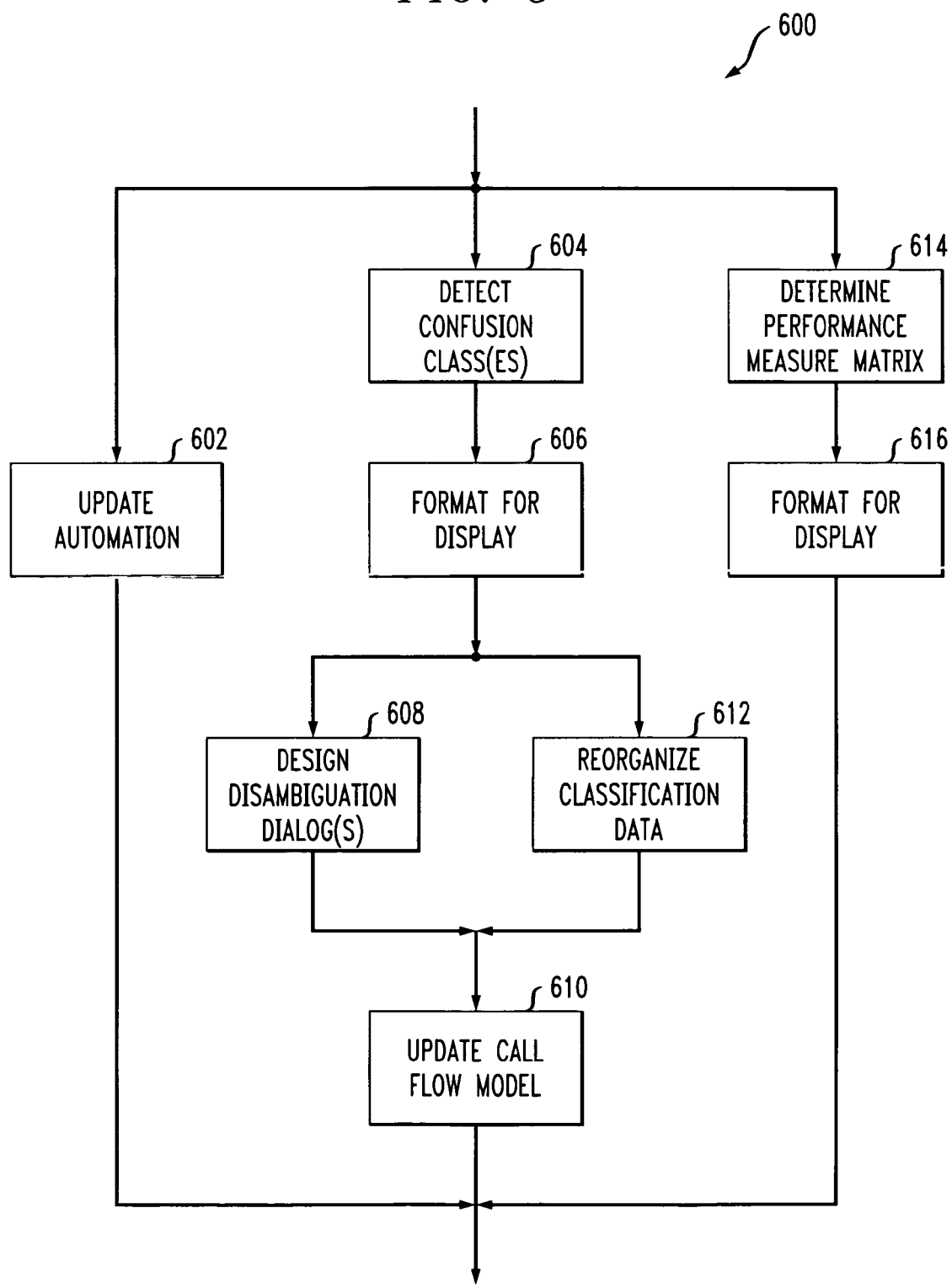
FIG. 6 is a flow chart showing certain possible monitoring activities in the method of FIG. 5.

Reference should now be had to FIG. 6, which, as noted, shows certain possible steps that can be carried out during the monitoring process represented by block 522 in FIG. 5. The possible monitoring activities are represented generally by flow diagram 600 in FIG. 6. One possible activity is indicated at block 602, labeled "update automation." This type of function is useful when some fractional amount of the transactions handled by the system are to be performed by human operators, and the remainder are to be automated. In such a case, one can observe a change in the unisolated performance metric of the system, and can then change the fraction of transactions that are being handled by human beings to a new value, and possibly to a different set of operators, depending on whether an improvement or degradation in the unisolated performance metric has been detected while observing the system performance. The change in the amount of transactions to be handled by human operators can, but need not, be carried out by the system and method of the present invention per se; instead, suitable calculations can be performed and appropriate data can be formatted to effect the changes through human operator intervention, or via an external machine agent.

As indicated at block 604, another monitoring activity can be the detection of confusion classes, that is, certain classes that are likely to result in incorrect classification. For example, if the business system is a call routing center, and there are two different loan departments, for example, a consumer loan department and a mortgage loan department, it may be that customer dialogs containing the word "loan" are frequently misdirected. If desired, such confusion classes can be formatted for display to a human operator, as indicated at block 606, and appropriate disambiguation dialogs can be designed, as at block 608. For example, such a disambiguation dialog, in the case just considered, could involve asking a caller whether he or she was interested in a consumer loan or a mortgage loan. After such a disambiguation dialog has been designed, a call flow model of the call center or other natural language business system can be updated as per block 610. The call flow model encompasses appropriate decisional business logic as to how transactions such as calls are to be classified or associated with desired concepts (in the special case of a call center, how calls are to flow or be routed), and can be stored in memory, for example, in one or more of components 114, 116, 204, 304, 306, 308, 304', 306', 308', which will be discussed below. The call flow model can typically include a specification of the dialog, including appropriate responses (system prompts and actions (e.g. transfer call, perform a transaction, look up information, etc.)) to user utterances.

As indicated at block 612, another alternative when a confusion class has been detected is to reorganize the classification data, with or without human intervention; accordingly, if block 612 were chosen and no human intervention were employed one might choose not to formal for display as per block 606. Still referring to FIG. 6, in another aspect of the monitoring process, one can determine data that represents a performance measure matrix indicative of performance of the system. Such data could include metric data associated with the optimization of the unisolated performance metric. Other data that can be included are one or more of the number of misdirected calls, automation rate, confidence scores, response times, time to resolution, call distribution, operator cost, scheduling of human agents/operators, failure/degradation monitoring, changes of the foregoing with time, and the like. This is indicated at block 614 in FIG. 6. The data can then be formatted for subsequent display to a human operator, as at block 616. The word "subsequent" does not necessarily indicate a time delay, but rather that the display of the actual data to a human user can be, where desired, external to the method and system of the present invention (or, of course, can be included therein via graphical user interface (GUI) or other display of the performance measure matrix).

Equation 8 below sets forth one specific example of the way the parameter R can be used to represent the unisolated performance metric. In a more general case, the parameter R can be calculated from the following equation:

$$R(\Psi_1, \Psi_2, \ldots, \Psi_j) = \prod_{i=1}^{M} P\left(\overset{*}{C}_i \mid A_i, \Psi_1, \Psi_2, \ldots, \Psi_j\right), \quad (2)$$

where:

$\Psi_1, \Psi_2, \ldots, \Psi_j$ include two or more statistical models of relevance to performance of the natural language business system, for example, at least the speech recognition model and the action classification model, $j \geq 2$, M is a total number of training sentences (see discussion below), $\overset{*}{C}_i$ is a correct class label for sentence i (see discussion below), and $A_i$ is a speech signal associated with sentence i (see discussion below).

The desired value of the unisolated performance metric is typically a maximized value of R.

Figure 7:
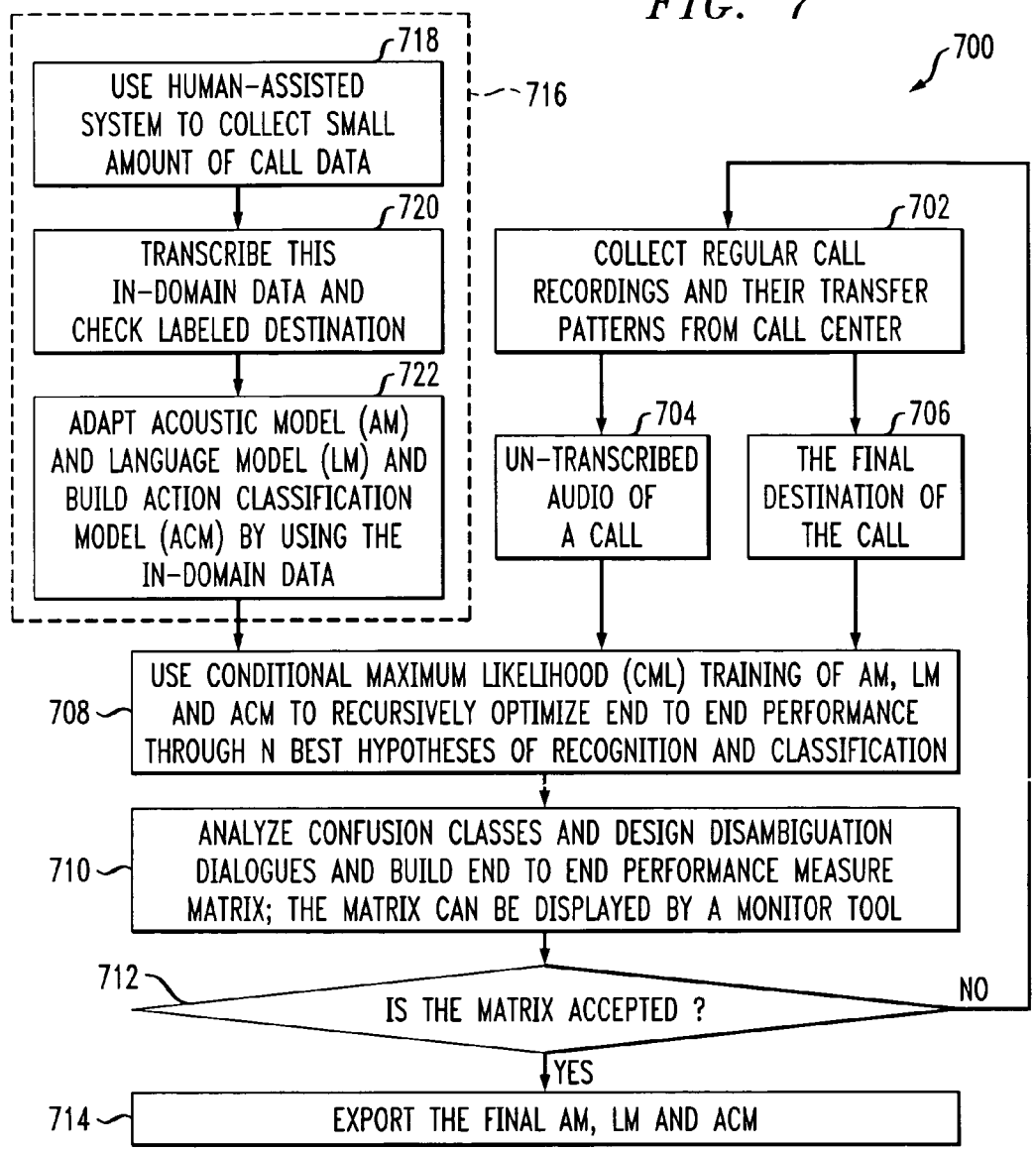
FIG. 7 is a flow chart of a specific embodiment of a method of developing a language business system according to the present invention.

Reference should now be had to FIG. 7, which shows a flow diagram 700 of a specific embodiment of a method in accordance with the present invention. The method depicted in FIG. 7 represents a special case of the method depicted in FIG. 5, where the natural language business system is a call center employing a speech recognition model that has a language model and an acoustic model, as well as an action classification model. Blocks 702, 704, 706 correspond to obtaining the audio data and associated action classification data as indicated at block 504 in FIG. 5. Block 708 corresponds to a specific type of modification and convergence checking as indicated for the more general case at blocks 506, 508 in FIG. 5. In particular, conditional maximum likelihood training of the language, acoustic and action classification models is employed to recursively optimize end-to-end performance of the system through N-best hypotheses of recognition and classification. Accordingly, block 708 represents one possible preferred implementation of the recursive optimization process described with respect to FIG. 5 above. It should be noted that other processes or algorithms can be employed, for example, 1-best hypotheses or minimum classification error (MCE) algorithms.

Block 710 corresponds to the monitoring process 522 of FIG. 5, and in the specific embodiment of FIG. 7, is shown as being performed after the recursive optimization. Analysis of confusion classes, design of disambiguation dialogs, and development of the performance measure matrix can proceed as described above, and the matrix can be displayed, if desired, by an appropriate monitor to an operator of the system. If the operator finds the matrix acceptable, the final acoustic, language and action classification models can be exported to appropriate storage for subsequent use in operation of the system, as indicated at blocks 712, 714. Conversely, if the performance measure matrix is deemed unacceptable, additional data can be gathered. Note that the decision to update the model can also be made automatically, not necessarily manually by the operator.

At block 716, one specific manner of developing initial models is depicted. A system, if desired, with human assistance, can be used to collect a relatively small amount of call data. The in-domain data can be transcribed, for example, by a human agent, and the human agent can label the data with the correct destination. Alternatively, a computer telephony integration (CTI) client or other automated system can enable recordation of the destination. A pre-existing non-domain-specific acoustic model can be adapted to obtain the initial acoustic model. Similarly, a pre-existing domain-independent language model can be adapted to obtain the initial language model. The adaptation of the foregoing models can be based on the transaction transcripts with labeled destinations and appropriate in-domain speech data. The action classification model can be built based on transaction transcripts with label destinations. These steps are depicted at blocks 718, 720, 722 of FIG. 7. Similar methods can be used to develop initial models for other types of natural language business systems, with appropriate concepts or transaction classifications corresponding to the general case of destination labels.

It should be appreciated that the transactions conducted by the system can include transactions with a number of different human agents of an enterprise that is using the natural language business system. Accordingly, when data is obtained, it can typically include a number of transactions with a number of different agents. Accordingly, knowledge of a number of different agents is inherently incorporated in the model update during the modifying step. This permits the present invention to transparently use knowledge of a number of different employees or agents to enhance system functionality.

Figure 2:
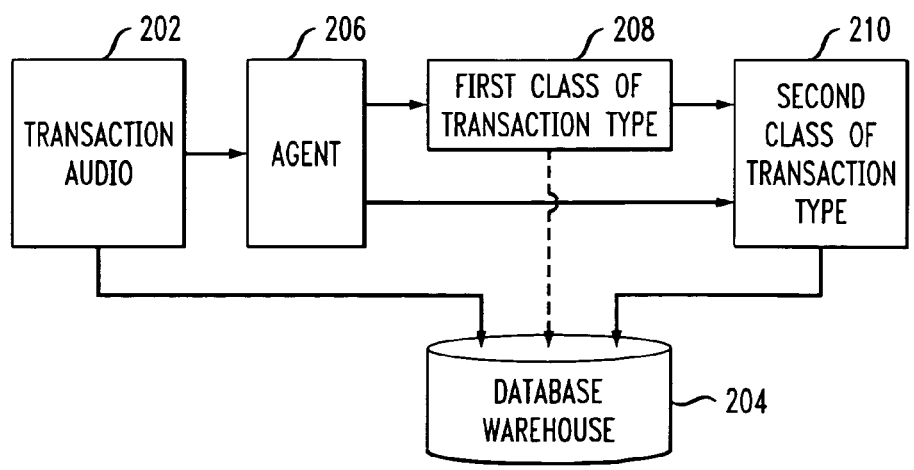
FIG. 2 is a diagram showing data collection according to the present invention.

FIG. 2 shows a typical manner in which the audio and action classification data can be obtained. As indicated at block 202, audio data associated with a given transaction can be sent to appropriate storage or other memory, such as database warehouse 204. In the example of FIG. 2, agent 206 (human or machine) directs the transaction to an appropriate destination for a first class of transaction type as indicated at block 208. Then, for example, if the first classification is incorrect, the caller or user is redirected to an appropriate destination for a second, correct class of transaction type 210. Typically, at least the audio data and the correct transaction type are recorded in appropriate storage or memory such as database warehouse 204. In the case where the first class of transaction was also correct, and the user or caller had multiple transactions to transact, one might choose to store the first class of transaction type as well; further, one could store the incorrect transaction type for use in improving system performance through design of disambiguation dialogs or otherwise.

Figure 8:
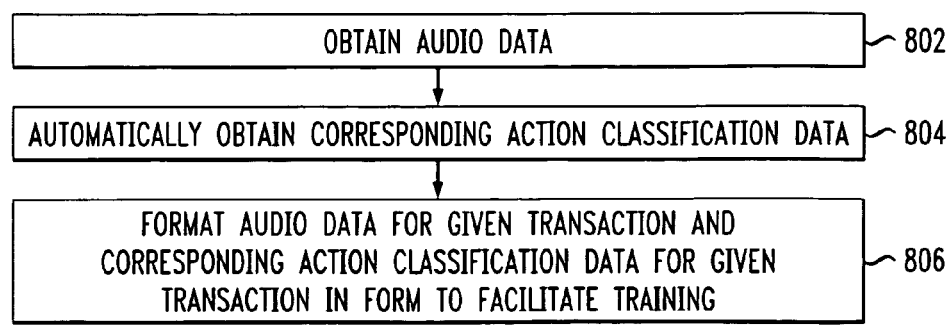
FIG. 8 is a flow chart of a method of gathering training data according to the present invention.

With continued reference to FIG. 2, and giving attention also now to FIG. 8, it will be appreciated that the data gathering process can be automated in accordance with the present invention. Audio data for pertinent transactions can be obtained during system operation per block 802. Further, as indicated at block 804, action classification data (for example, a call transfer pattern, a department type, or a transaction type) that corresponds to the audio data can be automatically obtained. At block 806, the audio data and corresponding action classification for each pertinent transaction can be formatted in a form to facilitate training of the speech recognition model and/or the action classification model. Such formatting could be, for example, a suitable format for storage in database warehouse 204. The automatic data gathering can be controlled, for example, by the control module 308, 308' in conjunction with, for example, a computer telephony integration (CTI) client-server architecture as discussed below.

Figure 1:
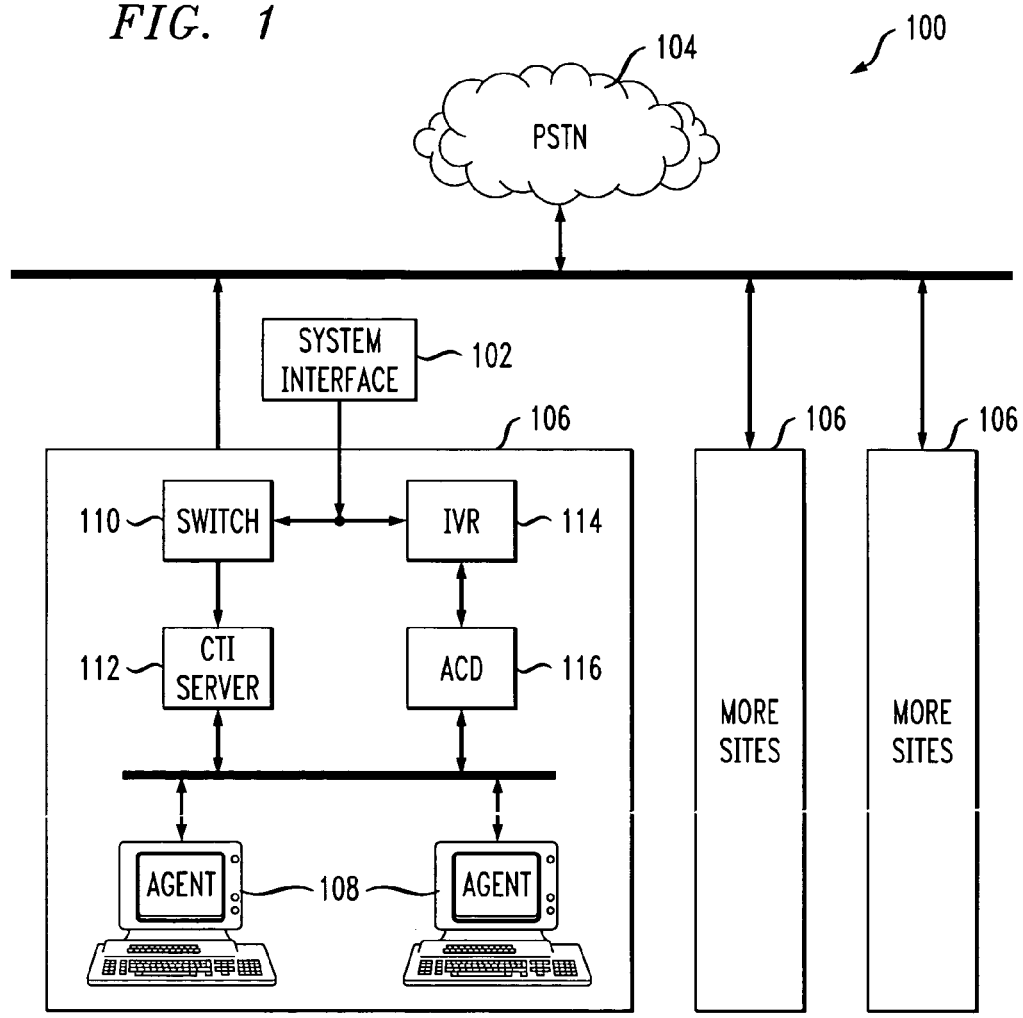
FIG. 1 is a diagram of a natural language call center configured to interface with a system according to the present invention.

Giving attention now to FIG. 1, a processing center 100 that conducts a plurality of verbal transactions is shown with an appropriate system interface 102 to the natural language business system of the present invention. The processing center can be, for example, a call center. One or more call center sites 106 can interact with users, for example, over the public switched telephone network 104. In a known manner, each site can include a number of agent terminals or personal computers 108, a switch 110, a CTI server 112, an interactive voice response system 114, and an automatic call distributor 116. System interface 102 can include an appropriate telephony card or, in the case of voice over IP, a network card. One suitable type of card is the Dialogic/MNS telephony card employed for bridging, recording and prompting; those skilled in the art will appreciate that a CTI client-server architecture can also be employed to effect system interface 102.

Figure 3:
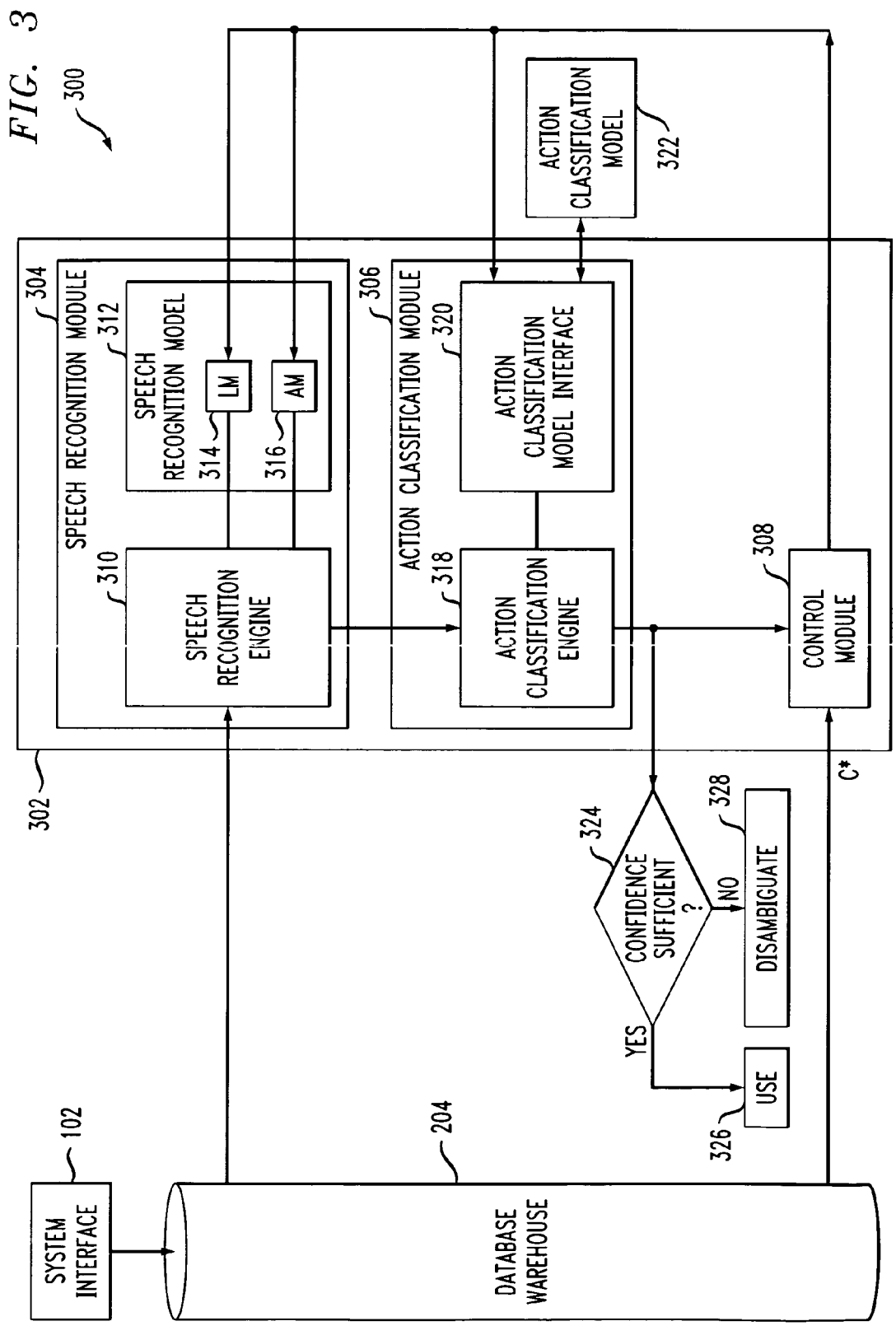
FIG. 3 is a diagram of a natural language business system according to the present invention.

Referring now to FIG. 3, a schematic diagram 300 shows a natural language business system 302 of the present invention interfacing with a processing center such as that depicted in FIG. 1 via previously described system interface 102 and database warehouse 204. System 302 includes speech recognition module 304, action classification module 306, and control module 308. The present invention contemplates a single system inclusive of modules 304, 306, 308, as well as a system including only module 308 and appropriate interfaces to work with external speech recognition and action classification modules, as discussed below with respect to FIG. 4. With continued reference to FIG. 3, recognition module 304 can include speech recognition engine 310 and a speech recognition model 312 coupled to engine 310. Recognition model 312 can initially correspond to an initial speech recognition model, and can include language and acoustic models 314, 316. The speech recognition engine can obtain speech data for a first set of transactions and can transcribe the speech data based on the initial speech recognition model. The data can be stored, for example, in database warehouse 204. Such is typically the case when updating of models is conducted in a batch mode. However, it will be appreciated that real-time or other modes of model updating can be employed when appropriate.

Action classification module 306 can include action classification engine 318 and action classification model interface 320. Module 306 can be realized in an appropriately modified simple action classifier, or, for example, in an appropriately modified natural language understanding (NLU) parser when additional capability is desired. Interface 320 can interface with action classification model 322, which initially holds the initial action classification model. The model 322 can be external or can be incorporated into the system 302. Action classification engine 318 obtains the transcribed speech data (for example, such data can be probabilistic N-best or word hypotheses lattices for each utterance) from the speech recognition engine 310 and classifies each of the first set of transactions based on the transcribed speech data and the initial action classification model. This, in turn, generates transaction classification data. One approach is to compute a set of alternative actions or parse trees, along with their respective probabilities or unisolated performance metrics, for each of the first set of transactions.

The control module 308 can be coupled to the speech recognition model 312 and the action classification model interface 320. Module 308 causes modification of one or more of the initial speech recognition model and the initial action classification model so as to obtain an iterated speech recognition model and an iterated action classification model, as described above with respect to the inventive method. Module 308 can cause the modification itself or in conjunction with other components such as modules 304, 306, for example, by sending an appropriate signal or formatting one or more appropriate commands. In one approach, module 308 will work on the set of alternative hypotheses generated above and use that to maximize some unisolated performance metric. The modification is based on the transcribed speech data and/or the transaction classification data, and as noted with respect to the method, is performed to effect a desired change in an unisolated performance metric that is pertinent to performance of the natural language business system (it is important to note that as used here and throughout the claims, the performance metric of the business system should be understood to include metrics pertinent to the system per se as well as to the overall performance of the processing center and of the combined processing center/system).

Control module 308 can be configured to perform any of the method steps described above, in conjunction with the modules 304, 306. When comparison of iterated models against a baseline is conducted, as described above, the baseline can be stored, for example, in the database warehouse 204. As indicated by optional functional blocks 324, 326, 328, appropriate consideration can be given to whether sufficient confidence exists in the iterated models, and the models can be either disambiguated, or further improved, or in the alternative, if confidence is sufficient, can be used. Blocks 324, 326, 328 can be conducted, for example, by appropriate logic in control module 308 and can correspond to the monitoring 522 of FIG. 5, the various monitoring options of FIG. 6, and blocks 710, 712, 714 in FIG. 7.

Figure 4:
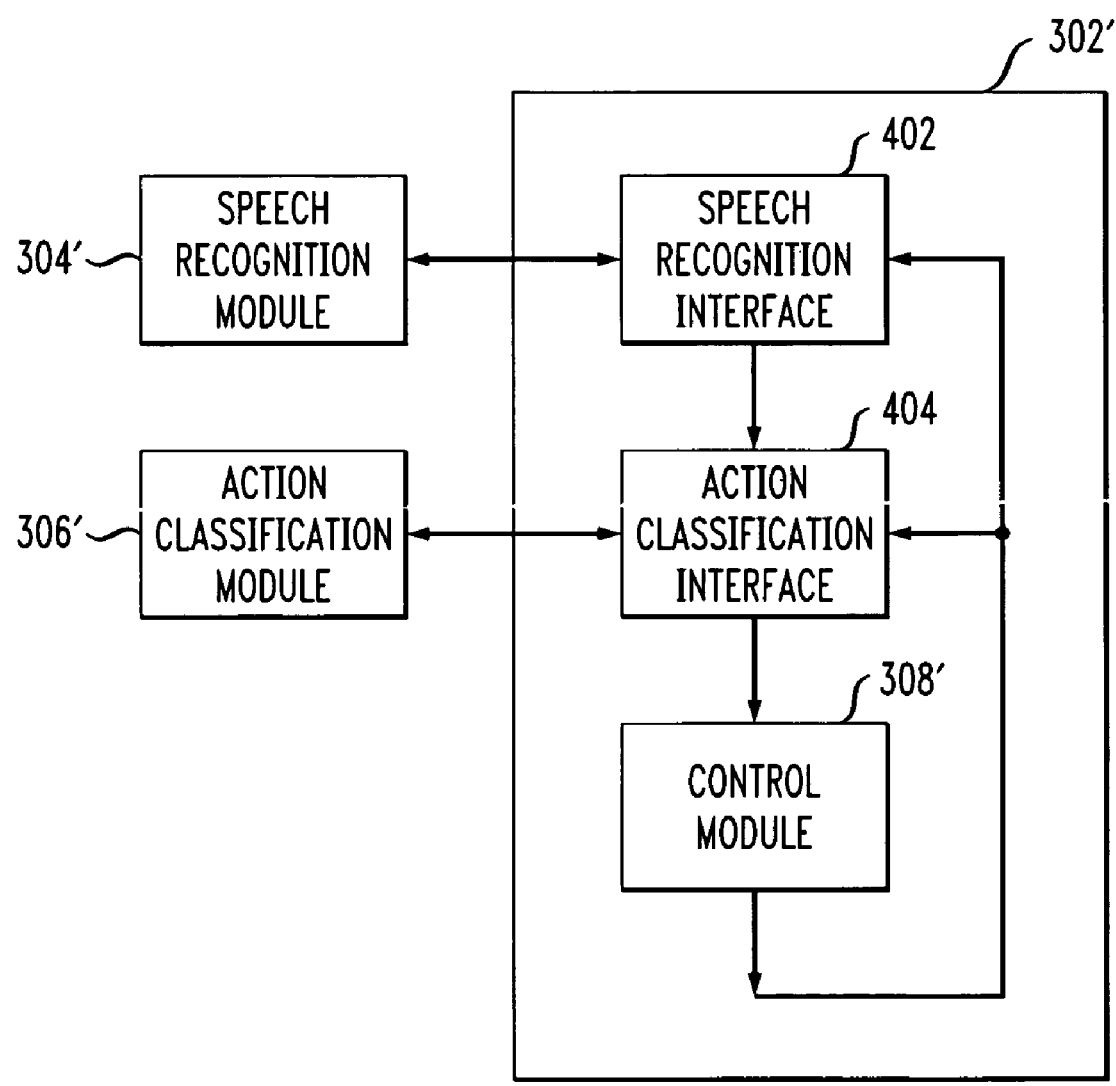
FIG. 4 is a diagram of an alternative natural language business system in accordance with the present invention.

With reference to FIG. 4, in an alternative embodiment of the present invention, system 302' includes speech recognition interface 402 and action classification interface 404 coupled to each other and control module 308'. The interfaces 402, 404 interface with speech recognition module 304' and action classification module 306' which are external to system 302'. Other than the externality of the speech recognition and action classification modules, functioning is similar to the system previously described.

Further comments, and a specific example applying the present invention to a natural language call routing system, will now be presented. Automatic speech recognition (ASR) systems used in spoken dialogue systems are mostly based on statistical models; in particular, the maximum a posterior rule is used to find the best word sequence $\tilde{W}$ for a given acoustic speech signal A:

$$\tilde{W} = \arg\max_{W} P(W \mid A) = \arg\max_{W} \frac{P(A \mid W)P(W)}{P(A)} \quad (3)$$

where P(A|W) is the acoustic model, and P(W) is the language model.

Traditionally, acoustic and language models have been trained separately based on the maximum likelihood criterion. Because the model assumptions are often incorrect and the amount of data used to train the models insufficient, maximum likelihood training may yield suboptimal solutions. Discriminative training of acoustic and language models using the Maximum Mutual Information (MMI) or Minimum Classification Error (MCE) criteria often results in better speech recognition performance, in terms of reduction in sentence or word error rates. There have also been attempts at adaptation of language models for spoken dialogue systems but these also largely aim at reducing the word or sentence error rate. The preceding principles are discussed in the following references: P. Woodland and D. Povey, "Large scale discriminative training of hidden Markov models for speech recognition," *Computer Speech and Language*, vol. 16, pp. 25-47, 2002; B.-H. Juang, W. Chou, and C.-H. Lee, "Minimum classification error rate methods for speech recognition," *IEEE Transactions on Speech and Audio Processing*, vol. 5, no. 3, pp. 257-265, May 1997; H.-K. J. Kuo, E. Fosler-Lussier, H. Jiang, and C.-H. Lee, "Discriminative training of language models for speech recognition," in *Proc. ICASSP* 2002 Orlando, Fla., May 2002; P. Gopalakrishnan, D. Kanevsky, A. Nadas, and D. Nahamoo, "An inequality for rational functions with applications to some statistical estimation problems," *IEEE Transactions on Information Theory*, vol. 37, pp. 107-113, 1991; S. Katagiri, B. H. Juang, and C.-H. Lee, "Pattern recognition using a family of design algorithms based upon the generalized probabilistic descent method," *Proceedings of the IEEE*, vol. 86, no. 11, pp. 2345-2373, November 1998; G. Riccardi, A. Potamianos, and S. Narayanan, "Language model adaptation for spoken language systems," in *Proc. IC-SLP* 1998, Sydney, Australia, December 1998; and B. Souvignier and A. Keliner, "Online adaptation for language models in spoken dialogue systems," in *Proc. ICSLP* 1998, Sydney, Australia, December 1998. All references discussed hereinabove and hereinafter are expressly incorporated herein by reference.

For dictation systems, a low word error rate could be an appropriate goal to strive for. However, for spoken dialogue systems, the goal is to understand what the caller is saying (e.g. asking for information or to perform a transaction) rather than to get every single word correct. Thus unisolated performance metrics such as concept accuracy or classification accuracy are believed to be more relevant criterion functions that should be optimized.

As an example, consider the case of natural language call routing, where the goal is to automatically route a caller to the agent with the best expertise to handle the problem described by the caller in completely natural language, e.g. "hi there I was wondering um my car is kind of old and has been breaking down frequently just wondering if you've got good rates." This caller is routed to the Consumer Lending Department; he/she was not required to know or remember the correct name of the department. A common way of performing call routing is to train a statistical classifier and route to the destination (or class) $\tilde{C}$ according to:

$$\tilde{C} = \arg\max_{C_k} P(C_k | A) \approx \arg\max_{C_k} P(C_k | \tilde{W}), \quad (4)$$

where $\tilde{W}$ is the output of the speech recognizer. Traditionally, the classification model has been trained using maximum likelihood or heuristics popularly used in information retrieval, but discriminative training has been shown to dramatically improve performance and reduce the requirements for domain knowledge, as discussed in H.-K. J. Kuo and C.-H. Lee, "Discriminative training of natural language call routers," *IEEE Transactions on Speech and Audio Processing*, vol. 11, no. 1, pp. 24-45, January 2003.

Thus in natural language call routing, an appropriate objective is to minimize the routing (classification) error rate (CER), rather than the word error rate (WER). It thus may be suboptimal to estimate the acoustic and language models in isolation; instead it may be beneficial to jointly estimate the acoustic, language, and classification models to optimize the CER.

Call classification performance may be improved through tighter model coupling. Using the single best word sequence hypothesis from the recognizer as input to the call classifier (as in Equation 4) is likely suboptimal because of recognition errors. Better accuracy may be achieved by using a word lattice, "sausage," or N-best list from the speech recognizer, as discussed in references L. Mangu, E. Brill and A. Stolcke, "Finding Consensus in Speech Recognition: Word Error Minimization and Other Applications of Confusion Networks," in *Computer, Speech and Language*, 14(4):373-400, 2000; G. Tür, D. Hakkani-Tür, and G. Riccardi, "Extending boosting for call classification using word confusion networks," in *Proc. ICASSP* 2004, Montreal, Canada, May 2004; and G. Tür, J. Wright, A. Gorin, G. Riccardi, and D. Hakkani-Tür, "Improving spoken language understanding using confusion networks," in *Proc. ICSLP* 2002, Denver, Colo., September 2002. Using a list of N-best hypotheses from the recognizer, a better classification rule is $$\tilde{C} = \arg\max_{C_k} P(C_k | A) \approx \arg\max_{C_k} \sum_n P(C_k | W_n) P(W_n | A) \quad (5)$$

where $W_n$ is the $n^{th}$ best word sequence hypothesis. The posterior probability of class $C_k$ given the acoustic signal can be further expanded as $$P(C_k | A) \approx \sum_n P(C_k | W_n) \frac{P(A | W_n) P(W_n)}{P(A)} \quad (6)$$

$$= \frac{\sum_n P(C_k | W_n) P(A | W_n) P(W_n)}{\sum_j P(A | W_j) P(W_j)}. \quad (7)$$

An appropriate objective that is matched to the classification rule of Equation 5 is the following conditional probability $$R(\Lambda, \theta, \Phi) = \prod_{i=1}^{M} P(\overset{*}{C_i} | A_i, \Lambda, \theta, \Phi), \quad (8)$$

where $\Lambda$, $\theta$ and $\Phi$ are the acoustic, language, and classification models respectively, M is the total number of training sentences (typically, in a given batch of data that has been gathered and is being used for training), $\overset{*}{C_i}^*$ is the correct class label for a given one of the training sentences i, which may be determined by human labeling, or automatically according to the present invention (i.e. detecting the final destination reached by the caller or the specific transaction that solved the caller's problem), and $A_i$ is the speech signal associated with sentence i. $R(\Lambda, \theta, \Phi)$ is correlated with the classification accuracy and its maximization with respect to the component models leads to an increase in accuracy. In this example we estimate only the language model, while keeping other models constant.

Our baseline language model is a modified Kneser-Ney interpolated bigram (as is known, for example, from S. Chen and J. Goodman, "An empirical study of smoothing techniques for language modeling," in *Tech. Rep. TR*-10-98, Center for Research in Computing Technology, Harvard University, MA, 1998; it defines the bigram probability of word $w_2$ conditioned on word $w_1$ as $$P(w_2|w_1) = f(w_2|w_1) + b(w_1) u(w_2) \quad (9)$$

where $f(w_2|w_1)$ is a discounted bigram probability, $b(w_1)$ is a history dependent interpolation weight, and $u(w_2)$ is a unigram probability. These are estimated from training data as $$f(w_2 | w_1) = \frac{c(w_1 w_2) - \gamma(c(w_1 w_2))}{\sum_{w_1} c(w_1 w_2)} \quad (10)$$

$$b(w_1) = 1 - \sum_{w_2} f(w_2 | w_1). \quad (11)$$

$c(w_1 w_2)$ is the count of word pair $w_1 w_2$ in the training data, and $\gamma(c(w_1 w_2))$ is a count dependent discounting weight. The unigram $u(w_2)$ in equation 9 is chosen so that the unigram marginals of the resulting bigram match the data marginals. $u(w_2)$ can be further interpolated with a uniform distribution to give a non-zero probability to unseen words. This may be desirable to smooth the models.

The parameter estimation under the objective of Equation 8 is carried out using the extended Baum-Welch procedure of Gopalakrishnan et al.; this procedure is chosen because Equation 8 is a rational function of polynomials. To keep the estimated language model smooth, we update only the $f(w_2|w_1)$ portion of the bigram model while keeping $b(w_1)$ and $u(w_2)$ fixed at their original values. This choice of keeping the interpolation weights fixed can be, in essence, somewhat arbitrary, but with the goal to keep the smoothing mass of each history unchanged from the ML estimated model.

Applying the extended Baum-Welch procedure, we can derive the following parameter update equations $$\hat{f}(w_2|w_1) = (1-b(w_1))\frac{c^{num}(w_1w_2)-c^{den}(w_1w_2)+Df(w_2|w_1)}{\sum_{w_2}c^{num}(w_1w_2)-c^{den}(w_1w_2)+Df(w_2w_1)}, \quad (12)$$

where $c^{num}(w_1w_2)$ and $c^{den}(w_1w_2)$ denote numerator and denominator counts, respectively, obtained from a list of N most likely state sequences corresponding to each training sentence $$c^{num}(w_1w_2) = \sum_i \sum_{W_n \in N_i} P\theta^0(W_n|C_i^*, A_i) \quad (13)$$

$$\sum_{w_1w_2 \in w_n} \frac{f(w_2|w_1)}{f(w_2|w_1)+b(w_1)u(w_2)}$$

$$c^{den}(w_1w_2) = \sum_i \sum_{W_n \in N_i} P\theta^0(W_n|A_i) \quad (14)$$

$$\sum_{w_1w_2 \in w_n} \frac{f(w_2|w_1)}{f(w_2|w_1)+b(w_1)u(w_2)}.$$

$N_i$ denotes the N-best list corresponding to utterance i. $\theta^0$ is used to denote the language model parameter values at the current iteration.

The posterior probabilities of $W_n$ used in Equations 13 and 14 are obtained from the N-best lists and current language model as $$P_{\theta^0}(W_n|C_i^*, A_i) = \frac{P(C_i^*|W_n)P_{\theta^0}(W_n, A_i)^\alpha}{\sum_{W \in N_i} P(C_i^*|W)P_{\theta^0}(W, A_i)^\alpha} \quad (15)$$

$$P_{\theta^0}(W_n|A_i) = \frac{P_{\theta^0}(W_n, A_i)^\alpha}{\sum_{W \in N_i} P_{\theta^0}(W, A_i)^\alpha} \quad (16)$$

The parameter $\alpha$ is a log-likelihood scale that is used to get "reasonable" posterior probabilities; it is tuned on a held out set as discussed below. Note that the LM update according to Equation 12 does not involve the knowledge of the reference word script.

The extended Baum-Welch procedure suggests a D value to be used in 12. However, instead of using this value, we follow a strategy that is analogous to choosing D for conditional maximum likelihood (CML) estimation of acoustic models and was found to be useful in CML estimation of language models in the reference V. Goel, "Conditional maximum likelihood estimation for improving annotation performance of N-gram models incorporating stochastic finite state grammars," in *Proc. ICSLP* 2004, Jeju Island, Korea, October 2004. We select D as $$D = \lambda D^* \quad (17)$$

$$D^* = \max_{w_1, w_2} \frac{c^{num}(w_1w_2) - c^{den}(w_1w_2)}{f(w_2|w_1)}, \quad (18)$$

where $\lambda \geq 1.0$ is an empirically selected parameter (typically between 1 and 2, to optimize performance on a hold-out portion of gathered data). Note that this choice of D simply ensures positivity of the numerator on the right hand side (RHS) in 12, and consequently ensures validity of $\hat{f}(w_2|w_1)$. History $w_1$ dependent $D(w_1)$ values may be of value in CML estimation of acoustic models.

EXAMPLE

The experiments discussed herein were conducted on an IBM internal corpus collected for a natural language call routing system. The system routes incoming calls to one of 35 destinations.

The training data consisted of 27685 sentences containing 180K words. These sentences were divided into a trainset (24503 sentences) that was used in model training and a devset (3182 sentences) set that was used for selecting heuristic parameters. A separate data set containing 5589 sentences and 38K words was used as the testset. All of the trainset, devset, and testset sentences were hand labeled with correct destination classes.

A maximum entropy model was trained as the statistical classifier $P(C_k|W)$ used for call classification. For simplicity, only single word features (unigrams) were used, and the model was trained on the transcribed text of the trainset. Reference may be had to A. L. Berger, S. A. D. Pietra, and V. J. D. Pietra, "A maximum entropy approach to natural language processing," *Computational Linguistics*, vol. 22, no. 1, pp. 39-71, 1996.

The acoustic model training data consists of about 1000 hours of audio data. The acoustic feature vectors were obtained by first computing 13 Mel-cepstral coefficients (including energy) for each time slice under a 25.0 msec. window with a 10 msec. shift. Nine such vectors were concatenated and projected to a 60 dimensional space using linear discriminant analysis (LDA). An acoustic model was built on these features with a phone set containing 50 phones. Each phone was modeled with a three state left to right Hidden Markov Model (HMM). This, in addition to six states of two silence phones, resulted in 156 context independent states which were decision-tree clustered into 2198 context dependent states and modeled using state dependent Gaussian Mixture Models. There are 222620 Gaussians all together in the acoustic model.

This acoustic model was maximum a posteriori (MAP) adapted (refer to the reference J. L. Gauvain and C.-H. Lee, "Maximum a-posteriori estimation for multivariate Gaussian mixture observations of Markov chains," *IEEE Transactions on Speech and Audio Processing*, vol. 2, pp. 291-298, 1994) using the in-domain training data (trainset) with a weight that was found to yield minimum word error rate on the devset. The resulting acoustic model was the one used in all the experiments.

The language model that formed the baseline for our experiments was a bigram model described in Equation 9.

This model was estimated on the trainset using an IBM internal language modeling toolkit developed by Stanley Chen.

Using the acoustic and language models described above, 500-best lists were generated for trainset, devset, and testset. The top (most likely) hypothesis in the testset had word/sentence error rates of 23.30/46.02%. On the devset, the word/sentence error rates of the top hypothesis were 23.17/47.05% and on the train set they were 14.81/35.89%.

TABLE 1

N-best based classification accuracy and objective function values with iterations of language model update. Iteration 0 corresponds to the baseline language model.

| Iter'n | λ | trainset | | devset | | testset | |
|---|---|---|---|---|---|---|---|
| | | Obj. fn | Class. Acc. | Obj. fn | Class. Acc. | Obj. fn | Class. Acc. |
| 0 | | −7146 | 93.01 | −1787 | 85.95 | −3134 | 86.19 |
| 2 | 2.0 | −6804 | 93.43 | −1777 | 86.05 | −3112 | 86.37 |
| 4 | 2.0 | −6711 | 93.58 | −1775 | 86.02 | −3108 | 86.35 |
| 6 | 1.1 | −6576 | 93.78 | −1770 | 85.92 | −3098 | 86.38 |
| 8 | 2.0 | −6492 | 93.91 | −1768 | 86.05 | −3092 | 86.42 |
| 10 | 2.0 | −6425 | 93.99 | −1768 | 86.08 | −3087 | 86.37 |

We compared the classification accuracy of using the most likely hypothesis according to Equation 4 with that of using the N-best lists according to Equation 5.

The testset classification accuracy using the most likely hypothesis was 85.42%, for the devset it was 84.70%, and for the trainset it was 92.23%. To see the effect of ASR on classification accuracy, we computed the accuracy using the reference text. Resulting numbers were 89.32% on testset and 89.53% on devset and 96.41% on the trainset. Thus there appears to be an absolute degradation of about 4-5% in classification accuracy when using the top hypothesis from the ASR compared to the correct transcription.

To carry out N-best based classification according to Equation 5, the probabilities $P(W_n|A)$ were computed as described in Equation 16. A line search was carried out for parameter a and the value that gave optimal classification accuracy on the devset was chosen. This resulted in α=2.0 and devset classification accuracy of 85.95%. Using α=2.0 on the testset resulted in classification accuracy of 86.19%, a relative reduction of about 5% in classification error rate.

In the next set of experiments, we estimated the language model from N-best lists. Several iterations of LM (language model) update were carried out where each iteration consisted of gathering $c^{num}$ and $c^{den}$ according to Equations 13 and 14 finding history dependent $D^*(w_1)$ values (Equation 18 with maximization carried out only over $w_2$), conducting a line search for λ in Equation 18 so as to maximize the objective function value (Equation 8) on the devset, and updating the language model (Equation 12 with D replaced by $D(w_1)$). The resulting LM was used as the starting LM for the next iteration. We note that the objective function maximization on devset was carried out in an attempt to avoid over-training the language model.

Table 1 presents the objective function (obj. fn) values and N-best based classification (Equation 5) results (Class. Acc.) on the trainset, devset, and test-set. From this table, we note that the LM updates result in a significant increase in the objective function value and classification accuracy on the trainset. The improvements on the testset are encouraging. Note that we stopped at iteration 10 since the objective function stopped improving on the devset. However, the trainset and testset objective function and the error rate are still improving, suggesting that other stopping criteria may selected as appropriate.

We also looked at the effects of our language model updates on the word error rate and classification accuracy of the one-best hypothesis. Use of one-best corresponds to classification according to Equation 4 and may be useful in cases when N-best lists are only available at training time but testing is done on one-best hypothesis (possibly due to limited resources during run-time). From results presented in Table 2, we note that, interestingly (and somewhat expectedly), there is a consistent degradation in the word error rates while the test set classification accuracy increases with increasing iterations of LM updates. This reinforces the belief that direct optimization of the classification accuracy may be a better goal to strive for than word error rate even when there is only the most likely hypothesis available at test time.

TABLE 2

One-best word error rate and classification accuracy with iterations of LM updates. Iteration 0 corresponds to the baseline language model.

| | trainset | | devset | | testset | |
|---|---|---|---|---|---|---|
| | word error rate | Class. acc. | word error rate | Class. acc. | word error rate | Class. Acc. |
| 0 | 14.81 | 92.23 | 23.17 | 84.70 | 23.30 | 85.42 |
| 2 | 14.82 | 93.09 | 23.19 | 84.79 | 23.43 | 85.76 |
| 4 | 14.98 | 93.36 | 23.41 | 84.88 | 23.67 | 85.81 |
| 6 | 15.31 | 93.58 | 23.72 | 84.60 | 24.04 | 85.95 |
| 8 | 15.81 | 93.70 | 24.09 | 84.85 | 24.40 | 85.94 |
| 10 | 16.32 | 93.82 | 24.63 | 84.70 | 24.82 | 85.92 |

We note that in the experiments reported here, the N-best lists were kept fixed. This may have provided us some protection from degrading the classification performance but may also have limited the gains that we see from this technique. It may be desirable to re-generate N-bests at each iteration under the updated language model.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. An article of manufacture comprising a tangible computer readable storage medium including computer usable program code for enhancing performance of a natural language system employing an initial speech recognition model and an initial action classification model, said system, during operation, engaging in a plurality of transactions, said an article of manufacture including:

computer usable program code for obtaining, during the operation of said system based on the initial speech recognition model and the initial action classification model, for pertinent ones of said transactions, transaction data comprising at least audio data and associated transaction classification data;

computer usable program code for modifying at least one of the initial speech recognition model and the initial action classification model to obtain an iterated speech recognition model and an iterated action classification model, said modifying being based at least in part on said audio data and associated transaction classification data, so as to effect a desired change in an unisolated performance metric pertinent to performance of said natural language system, said modifying comprising jointly modifying the initial speech recognition model and the initial action classification model so as to effect said desired change in said unisolated performance metric; and computer usable program code for repeating said modifying step, with said iterated speech recognition model and said iterated action classification model substituted for the initial speech recognition model and the initial action classification model, until a desired value of said unisolated performance metric is achieved, whereby said unisolated performance metric is recursively optimized;

wherein:

the initial speech recognition model comprises an initial acoustic model and an initial language model;

said iterated speech recognition model comprises an iterated acoustic model and an iterated language model;

said modifying of the initial speech recognition model comprises modifying at least one of the initial language model and the initial acoustic model;

said unisolated performance metric is given by the equation:

$$R(\Lambda, \theta, \Phi) = \prod_{i=1}^{M} P(\overset{*}{C}_i | A_i, \Lambda, \theta, \Phi),$$

where:

$\Lambda$ is said acoustic model, $\theta$ is said language model, $\Phi$ is said classification model, M is a total number of training sentences, $\overset{*}{c}_i$ is a correct class label for sentence i, and A is a speech signal associated with sentence i;

said desired value of said unisolated performance metric comprises a maximized value of R;

said classification model is constructed in accordance with:

$$\tilde{C} = \underset{C_k}{\operatorname{argmax}} P(C_k | A) \approx \underset{C_k}{\operatorname{argmax}} \sum_n P(C_k | W_n) P(W_n | A);$$

where $W_n$ is $n^{th}$ best word sequence hypothesis;

$$P(W_n | A_i) = \frac{P_{\theta 0}(W_n, A_i)^\alpha}{\sum_{W \in N_i} P_{\theta 0}(W, A_i)^\alpha};$$

$\alpha$ is a log-likelihood scale;

further comprising computer usable program code for carrying out a line search on a held-out segment of said transaction data to obtain a value of $\alpha$.

* * * * *